(12) United States Patent
Cai et al.

(10) Patent No.: US 8,324,327 B2
(45) Date of Patent: Dec. 4, 2012

(54) GAS-PHASE POLYMERIZATION PROCESS

(75) Inventors: Ping Cai, Lake Jackson, TX (US);
Roger B. Painter, Rosharon, TX (US);
Jan W. Van Egmond, Charleston, WV (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/674,475

(22) PCT Filed: Aug. 21, 2008

(86) PCT No.: PCT/US2008/073877
§ 371 (c)(1),
(2), (4) Date: Mar. 11, 2011

(87) PCT Pub. No.: WO2009/029486
PCT Pub. Date: Mar. 5, 2009

(65) Prior Publication Data
US 2011/0172377 A1 Jul. 14, 2011

Related U.S. Application Data

(60) Provisional application No. 60/957,888, filed on Aug. 24, 2007.

(51) Int. Cl.
*C08F 2/34* (2006.01)
*B01J 19/24* (2006.01)
(52) U.S. Cl. ............................. 526/60; 526/59; 422/131
(58) Field of Classification Search .................... 526/59, 526/60; 422/131
See application file for complete search history.

(56) References Cited

U.S. PATENT DOCUMENTS

| | | | |
|---|---|---|---|
| 4,746,762 A | 5/1988 | Avidan et al. | |
| 5,462,999 A | 10/1995 | Griffin et al. | |
| 5,698,642 A | 12/1997 | Govoni et al. | |
| 6,391,985 B1 | 5/2002 | Goode et al. | |
| 6,460,412 B1 * | 10/2002 | Cai et al. | 73/290 V |
| 6,753,390 B2 | 6/2004 | Ehrman et al. | |
| 6,759,489 B1 | 7/2004 | Turkistani | |
| 7,025,938 B2 | 4/2006 | Olson et al. | |
| 2007/0270558 A1 | 11/2007 | Scherrer et al. | |

FOREIGN PATENT DOCUMENTS

| | | |
|---|---|---|
| WO | 01/09196 A1 | 2/2001 |
| WO | 02/35206 A2 | 5/2002 |

OTHER PUBLICATIONS

S.P. Babu et al., The American Institute of Chemical Engineers, No. 176, vol. 74, 1978, pp. 176-186.
J. Yerushalmi et al., The American Institute of Chemical Engineers, No. 176, vol. 74, 1978, pp. 1-13.
Li Youchou et al., Journal of Chemical Technology and Biotechnology, 34B, 1984, pp. 537-544.
Burdett, I.D., et al., "Gas-Phase Fluidization Technology for Production of Polyolefins", Union Carbide Corporation, 2001.
Cai, P, at al., "Effect of Operating Temperature and Pressure on the Transition from Bubbling to Turbulent Fluidization", Journal of Chemistry Industry and Engineering(China), vol. 5 No. 1, 1990.
Cai, P., et al., "A Generalized Method for Predicting Gas Flow Distribution between the Phase in FBC", Fluidized Bed Combustion, vol. 2, 1993.

* cited by examiner

*Primary Examiner* — Fred M Teskin
(74) *Attorney, Agent, or Firm* — Whyte Hirschboeck Dudek SC

(57) ABSTRACT

A process for polymerizing one or more olefins in a gas-phase polymerization reactor is provided. The gas-phase reactor has a fluidized bed and a fluidizing medium. The fluidizing medium has an operating density and an operating velocity. The process includes determining a critical gas velocity and/or determining a critical gas velocity for the polymerization. The operating gas density and/or the operating gas velocity for the fluidizing medium is then adjusted to be less than or equal to its respective critical value. The process includes increasing the bulk density of the fluidized bed. The increase in the fluidized bed bulk density increases productivity without increasing reactor residence time.

14 Claims, 2 Drawing Sheets

GAS-PHASE POLYMERIZATION PROCESS

REFERENCE TO RELATED APPLICATION

This application claims the benefit of U.S. Provisional Application No. 60/957,888, filed on Aug. 24, 2007; which application is fully incorporated herein by reference.

BACKGROUND

The present disclosure relates to processes for producing polymers and gas-phase polymerization of olefins in particular.

Gas-phase polymerization is a known process for producing polymers. Gas-phase polymerization production efficiencies move toward the maximization of the polymer production rate. When the volume of the gas-phase reactor is fixed, an increase of the reactor inventory is one approach to toward production maximization. Reactor inventory can be increased by increasing the bulk density of the fluidized bed (i.e., increasing the fluidized bulk density).

Attempts to manipulate fluidized bulk density for increased productivity carry a high degree of uncertainty. Control of the fluidized bulk density is complex and difficult. The bulk density of the fluidized bed is a complicated interplay between many operational parameters such as upper/lower bed pressure/weight; bed height; bed temperature; gas pressure, composition, and flow rate; particle morphology; bed settled bulk density; and fluidization regime. It is difficult to prepare a fluidized bed model that captures all these parameters and accurately predicts fluidized hulk density characteristics under actual operating conditions. Such uncertainty poses the risk of sheeting, chunking, fouling, bed collapse, and/or reactor shutdown. The benefit of polymer production maximization by way of manipulation of the fluidized bulk density is balanced against these risks.

Desirable would be a gas-phase polymerization process that increases the bulk density of the fluidized bed and simultaneously avoids sheeting, chunking, overheating, bed collapse, and/or reactor shutdown.

SUMMARY

The present disclosure is directed to processes and reactors for increasing the bulk density of the fluidized bed in a gas-phase polymerization reactor. The present processes increase polymer production by increasing the bulk density of the fluidized bed. The fluidized bulk density is increased with reduced risk, or no risk, of sheeting, chunking, overheating, bed collapse and/or reactor shutdown.

In an embodiment, a process for polymerizing one or more olefins in a gas-phase reactor is provided. The gas-phase reactor has a fluidized bed and a fluidizing medium. The fluidizing medium has an operating gas density. The process includes determining a critical gas density for the fluidizing medium. The critical gas density is determined with the following equation, $$\left(\frac{a \times APS \times SBD}{SGV}\right)^b$$

wherein a is a constant having a value from about 3.5 to about 6.2, b is a constant having a value from about 1.7 to about 2.7, APS is an average particle size of the fluidized bed as measured in inches, SBD is a settled bulk density of polymer particles of the bed measured in lb/ft$^3$, and SGV is a gas velocity of the fluidizing medium as measured in ft/second. The process also includes adjusting the operating gas density of the fluidizing medium to be less than or equal to the critical gas density. The adjustment of the operating gas density increases the bulk density of the fluidized bed.

The process includes maintaining the fluidized bed in at least turbulent regime during the adjustment of the operating gas density. The process can also include moving the fluidized bed from the fast fluidization regime to the turbulent regime. This increases the bulk density of the bed.

In an embodiment, adjustment can occur by way of adjustment of the partial pressure of a gas contained in the fluidizing medium, adjustment/change of the composition of the fluidizing medium, or adjustment of the reactor pressure.

In an embodiment, the fluidizing medium includes propylene gas and at least one other gas. The process includes maintaining the fluidized bed in at least a turbulent regime, and decreasing the propylene partial pressure of the fluidizing medium to increase the bulk density of the fluidized bed. The propylene partial pressure can be reduced alone or in combination with decreasing the velocity of the fluidizing medium.

In an embodiment, the process includes decreasing the operating gas density from above the critical gas density to below the critical gas density. This increases the bulk density of the fluidized bed.

In an embodiment, another polymerization process is provided. The process is for polymerizing one or more olefins in a gas-phase reactor. The reactor has a fluidized bed and a fluidizing medium. The fluidizing medium has an operating gas velocity. The process includes determining a critical gas velocity for the fluidizing medium. The critical gas velocity is determined with the following equation:

$$\frac{a \times APS \times SBD}{(FMD)^{1/b}}$$

wherein a is a constant having a value from about 3.5 to about 6.2, b is a constant having a value from about 1.7 to about 2.7, APS is an average particle size of the fluidized bed as measured in inches, SBD is a settled bulk density of polymer particles of the bed measured in lb/ft$^3$, and FMD is a density of the fluidizing medium as measured in lb/ft$^3$. The process includes adjusting the operating gas velocity to less than or equal to the critical gas velocity. The fluidized bed is maintained in at least the turbulent regime during the adjustment(s). The adjustment of the operating velocity can include moving the fluidized bed from a fast fluidization regime to a turbulent regime.

in an embodiment, operating gas velocity is adjusted from a velocity greater than the critical gas velocity and is decreased to less than or equal to the critical gas velocity. This increases the bulk density of the fluidized bed.

In an embodiment, the process includes adjusting the operating gas velocity from a velocity greater than Uk to a velocity less than Uk. This increases the bulk density of the fluidized bed. The operating gas velocity is maintained at a velocity greater than Uc.

The present disclosure provides another process. In an embodiment, a process for polymerizing one or more olefins in a gas-phase reactor is provided. The reactor has a fluidized bed and a fluidizing medium. The fluidizing medium has an operating gas density and an operating gas velocity. The process includes determining a critical gas velocity for the fluidizing medium with the following equation;

$$\frac{a \times APS \times SBD}{(FMD)^{1/b}}$$

wherein a is a constant having a value from about 3.5 to about 6.2, b is a constant having a value from about 1.7 to about 2.7, APS is an average particle size of the fluidized bed, SBD is a settled bulk density of the fluidized bed, and FMD is a density of the fluidizing medium. The process includes adjusting the operating gas density or the operating gas velocity so that the operating gas velocity is less than or equal to the critical gas velocity.

In an embodiment, the process includes adjusting the operating gas density and adjusting the operating gas velocity. These adjustments are performed so that the operating gas velocity is less than or equal to the critical gas velocity.

In an embodiment, the fluidizing medium is composed of propylene gas and at least one other gas. The process includes decreasing the partial pressure of the propylene gas. This adjustment increases the bulk density of the fluidized bed.

In an embodiment, the process includes decreasing the operating gas velocity from a velocity greater than the critical gas velocity to a velocity less than the critical gas velocity. This increases a bulk density of the fluidized bed.

The present disclosure provides an apparatus. In an embodiment, a gas-phase polymerization reactor is provided. The gas phase reactor includes a fluidized bed of polymer particles fluidized by a fluidizing medium. The polymer particles have an average particle size from about 0.014 inches to about 0.12 inches. The fluidized bed has a bulk density from about 7 lb/ft$^3$ to about 40 lb/ft$^3$. The fluidizing medium has an operating gas density less than or equal to the critical gas density, the critical gas density being determined as above. The fluidizing medium can also have an operating velocity that is less than or equal to the critical gas velocity as discussed above. The fluidized bed is in at least the turbulent regime.

In an embodiment, the gas-phase polymerization reactor includes a catalyst composition and at least one olefin gas in an interior of the gas-phase reactor. The polymer particles formed from the polymerization can be propylene-based polymer, ethylene-based polymer, and ethylene/propylene rubber. The polymer particles have a settled bulk density from about 15 lb/ft$^3$ to 35 lb/ft$^3$.

In an embodiment, the fluidizing medium has a velocity from about 0.5 ft/second to about 2.6 ft/second. The fluidizing medium has a density from about 1.0 lb/ft$^3$ to about 5.0 lb/ft$^3$.

In an embodiment, the fluidizing medium includes propylene and hydrogen. The propylene has a partial pressure from about 300 psia to about 400 psia.

Any of the processes disclosed herein can include the introduction of a catalyst composition into the reactor to form a fluidized bed having an average particle size from about 0.014 inches to about 0.12 inches.

Any of the processes disclosed herein can include the production of polymer particles having a settled bulk density from about 15 lb/ft$^3$ to about 35 lb/ft$^3$.

Any of the processes disclosed herein can include the passage of the fluidizing medium through the reactor at a velocity from about 0.8 ft/second to about 5.0 ft/second.

Any of the processes disclosed herein can include increasing the bulk density of the fluidized bed from about 10 wt % to about 100 wt %. The bulk density increase is based on the bulk density before the adjustments.

The present disclosure provides an improved process for the gas-phase polymerization of one or more olefins.

An advantage of the present disclosure is the ability to increase productivity by increasing the bulk density of the fluidized bed.

An advantage of the present disclosure is the ability to increase the fluidized bulk density with little or no risk of sheeting, chunking, overheating, bed collapse and/or reactor shutdown.

An advantage of the present disclosure is a gas-phase polymerization process with improved productivity that requires no increase in reactor residence time.

DETAILED DESCRIPTION

Figure 1:
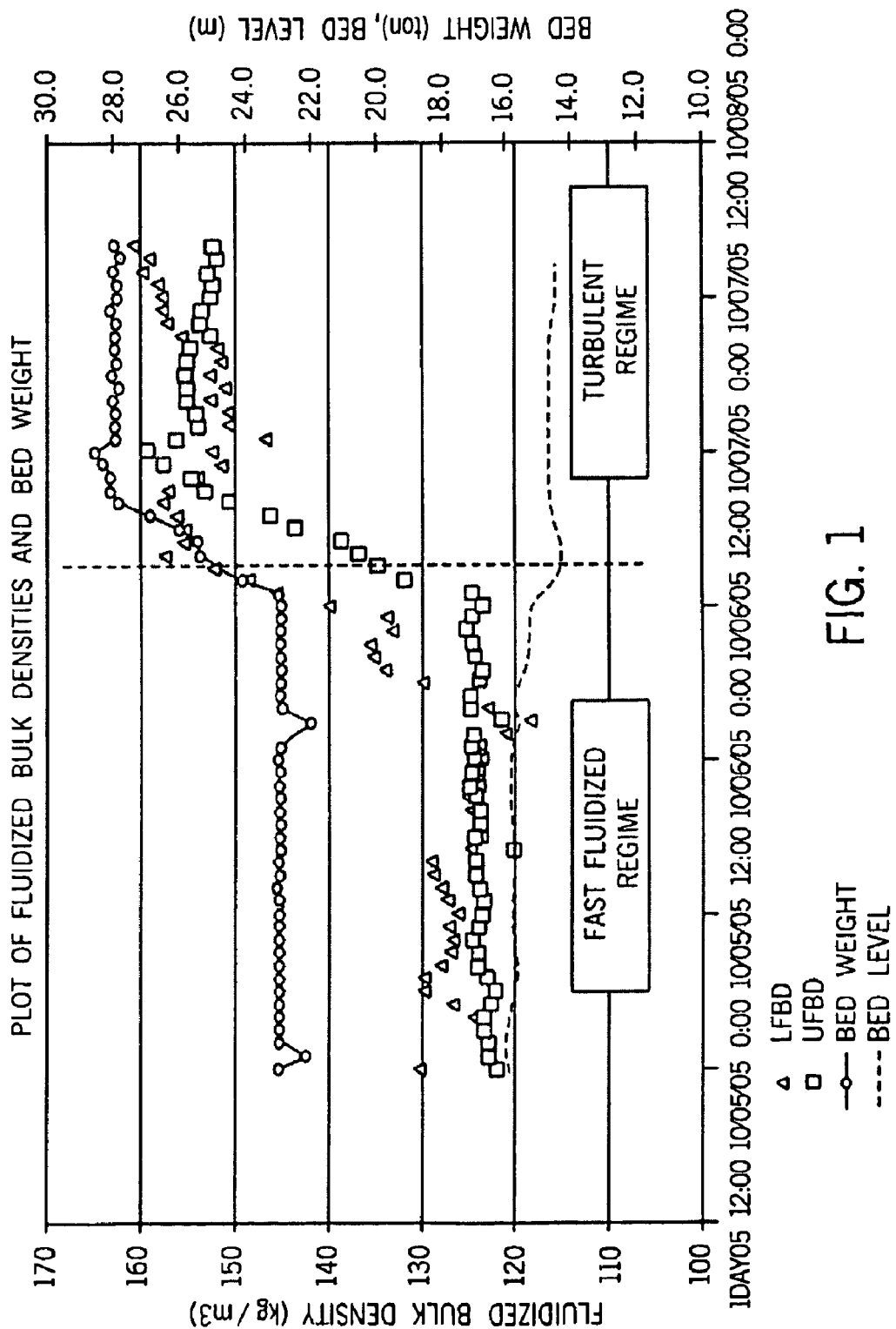
FIG. 1 is a graph of gas velocity (SGV) and propylene partial pressure in accordance with an embodiment of the present disclosure.

In an embodiment, a process for polymerizing one or more olefins in a gas-phase reactor is provided. The gas-phase reactor includes a fluidized bed and a fluidizing medium. The fluidizing medium has an operating gas density. The method includes determining a critical gas density for the fluidizing medium and adjusting the operating gas density to be less than or equal to the critical gas density.

As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

Many operational parameters are monitored and controlled during gas-phase polymerization. One parameter is fluidized bulk density. The "fluidized bulk density" (or "FBD") is the weight of solid (i.e., polymer particles) per unit volume in the fluidized bed. FBD is a mean value which may be greater or less than the localized bulk density at any point in the fixed reactor portion. FBD is a direct indicator of a gas phase reactor's operating health. Unexpected changes in FBD often indicate that the reactor is experiencing problems.

Catalyst is typically fed into a lower section of the reactor. Reaction occurs upon contact between the catalyst and the fluidizing medium yielding growing polymer particles. The fluidizing medium passes upward through the fluidized bed, providing a medium for heat transfer and fluidization. The reactor includes an expanded section located above the reaction section. In the expanded section, particles having a terminal velocity higher than the velocity of the fluidizing medium disentrain from the fluidizing medium stream. After leaving the reactor, the fluidizing medium passes through a compressor and one or more heat exchangers to remove the heat of polymerization before it is re-introduced into the reaction section of the reactor. The fluidizing medium may or may not contain an amount of liquid after cooling and condensing.

One or more olefin monomers can be introduced in the gas-phase reactor to react with the catalyst and to form a polymer, or a fluidized bed of polymer particles. Nonlimiting examples of suitable olefin monomers include ethylene, propylene, $C_{4-20}$ α-olefins, such as $C_{4-12}$ α-olefins such as 1 butene, 1-pentene, 1 hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnaphthalene; and halogen-substituted $C_{8-40}$ vinyl aromatic compounds such as chlorostyrene and fluorostyrene.

Any olefin polymerization catalyst may be introduced into the gas-phase reactor. The catalyst may be added as a solid, a slurry or a solution, and may be supported on an inorganic or an organic support. The catalyst may be a pre-polymer. The catalyst may be conveyed into the reactor with a gas, liquid or gas/liquid mixture including for example gaseous ethylene, nitrogen, cycle gas and propane, or liquid propane, propylene, isopentane and liquified cycle gas condensed in the recirculation loop. The catalyst may be introduced into the reactor alone or in combination with the fluidizing medium.

As used herein, "a catalyst composition" is a composition that forms an olefin-based polymer when contacted with one or more olefins under polymerization conditions. "Polymerization conditions" are temperature and pressure parameters within a polymerization reactor suitable for promoting polymerization between a catalyst and an olefin to form the desired polymer. The catalyst composition may optionally include a cocatalyst, an internal electron donor, an external electron donor, a selectivity control agent, and any combination thereof. Nonlimiting examples of suitable catalyst compositions include Ziegler-Natta catalyst compositions, constrained geometry catalyst compositions, and metallocene catalyst compositions.

In an embodiment, the catalyst composition is a Ziegler-Natta catalyst composition. As used herein, a "Ziegler-Natta catalyst composition" is a combination of (1) a transition metal compound of an element for Periodic table groups IV to VIII (procatalyst) and (2) an organometallic compound of a metal from Periodic Table groups I to III (cocatalyst). Nonlimiting examples of suitable Ziegler-Natta procatalysts include halides or oxyhalides of titanium, vanadium, chromium, molybdenum, and zirconium. Nonlimiting examples of Ziegler-Natta cocatalysts include hydrides, alkyls, or aryls of aluminum, lithium, zinc, tin, cadmium, beryllium, and magnesium.

In an embodiment, a procatalyst precursor, which includes magnesium moieties, may be employed to form the procatalyst composition. Sources for such magnesium moieties include anhydrous magnesium chloride, magnesium alkoxides or aryloxides, mixed magnesium alkoxy halides, or carbonated magnesium dialkoxides or aryloxides. Nonlimiting examples of sources of magnesium moieties are magnesium di-($C_{1-4}$)alkoxides, especially diethoxymagnesium. Additionally the precursors may include titanium moieties. Suitable sources include titanium alkoxides, titanium aryloxides, titanium alkoxy halides, and titanium halides. Precursors may include one or more magnesium di($C_{1-4}$)alkoxides and one or more titanium tetra-($C_{1-4}$) alkoxides.

Various methods of making procatalyst precursor are known in the art. In particular, the preparation involves halogenation of the foregoing mixed magnesium and titanium alkoxides, and may involve the use of one or more compounds, referred to as "clipping agents", that aid in forming specific, low molecular weight, compositions of the desired morphology. Examples of suitable clipping agents include trialkylborates, especially triethylborate, phenolic compounds, especially cresol, and silanes.

In an embodiment, the procatalyst precursor is a mixed magnesium/titanium compound (MagTi) of the formula $Mg_d$-Ti$(OR^e)_eX_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each ORe group is the same or different; X is independently chlorine, bromine or iodine, preferably chlorine; d is 0.5 to 56, or 2 to 4; e is 2 to 116 or 5-15; and f is 3 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having especially desirable morphology and surface area. Moreover, the resulting precursors are particularly uniform in particle size.

The precursor is converted to a solid procatalyst by further reaction (halogenation) with a halogenating agent (step C) and incorporation of an internal electron donor. Suitable halogenating agents are titanium halides having the formula Ti(O-$R^e)_eX_h$, wherein $R^e$, X, and e are as defined above; h is an integer from 1 to 4; and e+h is 3 or 4. In an embodiment, the halogenation agent is TiCl$_4$. In an embodiment, the halogenation is conducted in the presence of a chlorinated aromatic liquid, such as dichlorobenzene, o-chlorotoluene, or chlorobenzene. In an embodiment, the halogenation is conducted by use of a mixture of halogenating agent and chlorinated aromatic liquid comprising from 40 to 60 volume percent halogenating agent, such as TiCl$_4$.

During (step C) the reaction mixture may be heated, if desired. In an embodiment, the precursor and halogenating agent are contacted initially at a temperature from 0° C. to 60° C., or from 20° C. to 30° C., and heating is commenced at a rate of 0.1 to 10.0° C./minute, or at a rate of 1.0 to 5.0° C./minute. The internal electron donor may be added later, after an initial contact period between the halogenating agent and precursor in order to reduce fines generation. Temperatures for the halogenation are from 60° C. to 150° C. (or any value or subrange therebetween), or from 90° C. to 120° C. Halogenation may be continued in the substantial absence of the electron donor for a period from 5 to 60 minutes, or from 10 to 50 minutes.

The internal electron donor may be a carboxylic, acid ester, a diether, a succinate, a dialkoxybenzene, or a diol ester. In an embodiment, the internal electron donor is a carboxylic acid ester such as $C_{1-10}$ alkyl diesters of aromatic dicarboxylic acids, particularly $C_{1-4}$ alkyl diesters of phthalic acid or terephthalic acid. Nonlimiting examples of suitable carboxylic acid esters include diethylphthalate, diisopropylphthalate, diisobutylphthalate, diisopropylterephthalate, and diisobutylterephthalate. Mixtures of the foregoing compounds may be employed, if desired. In an embodiment, the internal electron donor is di(isobutyl)phthalate. Sufficient internal electron donor usually is provided so that the molar ratio of internal electron donor to the magnesium present in the solid procatalyst precursor at this stage of the preparation is from about 0.01:1 to about 1:1, or from about 0.05:1 to about 0.5:1, or from about 0.03:1 to about 0.1:1.

The manner in which the procatalyst precursor, halogenating agent and internal electron donor are contacted may be varied. In an embodiment, the procatalyst precursor is first contacted with a mixture containing the halogenating agent and a chlorinated aromatic compound. The resulting mixture is stirred and may be heated if desired. Next, the internal electron donor is added to the same reaction mixture without isolating or recovering of the precursor. The foregoing process may be conducted in a single reactor with addition of the various ingredients controlled by automated process control.

Contact times of the precursor with the internal electron donor are at least 10 minutes, or at least 15 minutes, or at least 20 minutes, or at least 1 hour at a temperature from at least 25° C., or at least 50° C., or at least 60° C. up to a temperature of 150° C., or up to 120° C., or up to 115° C.

The resulting precursor is then recovered and contacted one or more times (step D) in the absence of the internal electron donor with a mixture of the halogenating agent in the chlorinated aromatic compound for at least 10 minutes, or at least 15 minutes, or at least 20 minutes, and up to 1 hour, or up to 45 minutes, or up to 30 minutes, at a temperature from at least 25° C., or at least 50° C., or at least 60° C., to a temperature up to 150° C., or up to 120° C., or up to 115° C.

After the foregoing halogenation procedure, the resulting solid procatalyst composition is separated from the reaction medium employed in the final process, by filtering for example, to produce a moist filter cake. The moist filter cake may then be rinsed or washed with a liquid diluent to remove unreacted $TiCl_4$ and may be dried to remove residual liquid, if desired. Typically the solid, exchanged procatalyst composition is washed one or more times with a "wash liquid," which is a liquid hydrocarbon such as an aliphatic hydrocarbon such as isopentane, isooctane, isohexane, hexane, pentane, or octane. The solid, exchanged procatalyst composition then can be separated and dried or slurried in a hydrocarbon, especially a relatively heavy hydrocarbon such as mineral oil for further storage or use.

The resulting solid procatalyst composition is in the form of porous particles having a titanium content of from about 0.1 percent by weight to about 6.0 percent by weight, based on the total solids weight, or from about 1.0 percent by weight to about 4.5 percent by weight, or from about 1.5 percent by weight to about 3.5 percent by weight. The weight ratio of titanium to magnesium in the solid, exchanged, procatalyst composition is suitably between about 1:3 and about 1:160, or between about 1:4 and about 1:20, or between about 1:6 and 1:13. The internal electron donor may be present in the procatalyst composition in a molar ratio of internal electron donor to magnesium of from about 0.005:1 to about 1:1, or from about 0.04:1 to about 0.4:1.

In an embodiment, the procatalysts herein are mixed magnesium/titanium compounds of the formula, $Mg_d Ti(OR^e)_e X_f (ED)_g$, wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; ED is an internal electron donor, such as diisobutylphthalate; d is 0.5 to 56; e is 0, 1, or 2; f is 3 to 116; and g is 0.005d to 1d.

The procatalyst composition may be further treated by one or more of the following procedures prior to or after isolation of the solid procatalyst. The solid procatalyst composition may be contacted (halogenated) with a further quantity of titanium halide compound, if desired; it may be exchanged under metathesis conditions with an acid chloride, such as phthaloyl dichloride or benzoylchloride, and it may be rinsed or washed, heat treated; or aged. The foregoing additional procedures may be combined in any order or employed separately, or not at all.

Not wishing to be bound by any particular theory, it is believed that further halogenation by contacting the previously formed procatalyst composition with a titanium halide compound, especially a solution thereof in a halohydrocarbon diluent, results in desirable modification of the procatalyst composition, possibly by removal of certain inactive metal compounds that are soluble in the foregoing diluent. Accordingly, in an embodiment, the procatalyst is contacted with a halogenating agent, such as a mixture of a titanium halide and a halohydrocarbon diluent, such as $TiCl_4$ and chlorobenzene, one or more times prior to isolation or recovery.

The co-catalyst may be chosen from any of the known activators of olefin polymerization catalyst systems employing a titanium halide, or an organoaluminum compound. Nonlimiting examples of suitable cocatalysts include trialkylaluminum compounds, alkylaluminum alkoxide compounds, including oligomeric or polymeric alumoxane or modified alumoxane modified by incorporation of one or more different trialkyl aluminum compounds, and alkylaluminum halide compounds. In an embodiment, the compounds of the foregoing list contain an alkyl group in which each alkyl group independently has from 1 to 6 carbon atoms. In a further embodiment, the cocatalyst is trialkylaluminum or a dialkylaluminumhalide compound, wherein each of the alkyl groups independently contain from 1 to 4 carbon atoms. In yet a further embodiment, the cocatalyst is triethylaluminum, triisopropylaluminum, triisobutylaluminum, diethylaluminum chloride, or mixtures thereof. The cocatalyst may be employed in a molar ratio of aluminum to titanium from about 1:1 to about 500:1, or from about 10:1 to about 200:1, or from about 35:1 to about 50:1.

In an embodiment, the catalyst composition includes an external donor that is a mixture of an activity limiting agent (ALA) and a selectivity control agent (SCA). The ALA is an ester of an aromatic carboxylic acid or a derivative thereof, an aliphatic ester, or a non-ester composition. Nonlimiting examples of suitable aromatic carboxylic acids include $C_{1-10}$ alkyl or cycloalkyl esters of aromatic monocarboxylic acids. Suitable substituted derivatives thereof include compounds substituted both on the aromatic ring(s) or the ester group with one or more substituents containing one or more Group 14, 15 or 16 heteroatoms, especially oxygen. Examples of such substituents include (poly)alkylether, cycloalkylether, arylether, aralkylether, alkylthioether, arylthioether, dialkylamine, diarylamine, diaralkylamine, and trialkylsilane groups. The aromatic carboxylic acid ester may be a $C_{1-20}$ hydrocarbyl ester of benzoic acid wherein the hydrocarbyl group is unsubstituted or substituted with one or more Group 14, 15 or 16 heteroatom containing substituents and $C_{1-20}$ (poly)hydrocarbyl ether derivatives thereof, or $C_{1-4}$ alkyl benzoates and $C_{1-4}$ ring alkylated derivatives thereof, or methyl benzoate, ethyl benzoate, propyl benzoate, methyl p-methoxybenzoate, methyl p-ethoxybenzoate, ethyl p-methoxybenzoate, and ethyl p-ethoxybenzoate. In an embodiment, the aromatic monocarboxylic acid is ethyl p-ethoxybenzoate.

In an embodiment, the ALA is an aliphatic ester. The aliphatic ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ alkyl mono- or polycarboxylate derivatives of $C_{2-100}$ (poly)glycols or $C_{2-100}$ (poly)glycol ethers. In a further embodiment, the $C_4$-$C_{30}$ aliphatic acid ester may be isopropyl myristate, di-n-butyl sebacate, (poly)(alkylene glycol)mono- or diacetates, (poly)(alkylene glycol)mono- or di-myristates, (poly)(alkylene glycol)mono or di-laurates, (poly)(alkylene glycol) mono- or di-oleates, glyceryl tri(acetate), glyceryl tri-ester of $C_{2-40}$ aliphatic carboxylic acids, and mixtures thereof in a further embodiment, the $C_4$-$C_{30}$ aliphatic ester is isopropyl myristate or di-n-butyl sebacate.

In an embodiment the ALA is a non-ester composition. As used herein, a "non-ester composition" is an atom, molecule, or compound that is free of an ester functional group. In other words, the "non-ester composition" does not contain the following functional group.

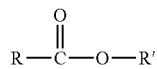

In an embodiment, the non-ester composition may be a dialkyl diether compound or an amine compound. The dialkyl diether compound is represented by the following formula,

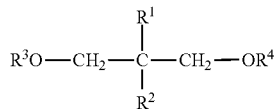

wherein $R^1$ to $R^4$ are independently of one another an alkyl, aryl or aralkyl group having up to 20 carbon atoms, which may optionally contain a group 14, 15, 16, or 17 heteroatom, provided that $R^1$ and $R^2$ may be a hydrogen atom. Nonlimiting examples of suitable dialkyl ether compounds include dimethyl ether, diethyl ether, dibutyl ether, methyl ethyl ether, methyl butyl ether, in ethyl cyclohexyl ether, 2,2-dimethyl-1,3-dimethoxypropane, 2,2-diethyl-1,3-dimethoxypropane, 2,2-di-n-butyl-1,3-dimethoxypropane, 2,2-di-iso-butyl-1,3-dimethoxypropane, 2-ethyl-2-butyl-1,3-dimethoxypropane, 2-n-propyl-2-cyclopentyl-1,3-dimethoxypropane, 2,2-dimethyl-1,3-diethoxypropane, 2-iso-propyl-2-iso-butyl-1,3-dimethoxypropane, 2,2-dicyclopentyl-1,3-dimethoxypropane, 2-n-propyl-2-cyclohexyl-1,3-diethoxypropane, and 9,9-bis(methoxymethyl)fluorene. In a further embodiment, the dialkyl ether compound is 2,2-di-n-butyl-1,3-dimethoxypropane.

In an embodiment, the non-ester composition is an amine compound. Nonlimiting examples of suitable amine compounds include 2,6-substituted piperidines such as 2,6-dimethylpiperidine and 2,2,6,6-tetramethylpiperidine and 2,5-substituted piperidines. In a further embodiment, the piperidine compound is 2,2,6,6-tetramethylpiperidine.

The SCA includes a silane. The silane may include one or more alkoxysilanes having the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms R contains up to 20 atoms not counting hydrogen and halogen R is a $C_{1-20}$ alkyl group, and in is 0, 1, 2 or 3. In an embodiment, R is $C_{6-12}$ aryl, alkyl or aralkyl, $C_{3-12}$ cycloallyl, $C_{3-12}$ branched alkyl, or $C_{3-12}$ cyclic amino group, R' is $C_{1-4}$ allyl, and m is 1 or 2. Nonlimiting examples of suitable silane compositions include dicyclopentyldimethoxysilane, di-tert-butyldimethoxysilane, methylcyclohexyldimethoxysilane, ethylcyclohexyldimethoxysilane, diphenyldimethoxysilane, diisopropyldimethoxysilane, di-n-propyldimethoxysilane, diisobutyldimethoxysilane, di-n-butyldimethoxysilane, cyclopentyltrimethoxysilane, isopropyltrimethoxysilane, n-propyhrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, bis(perhydroisoquinolino)dimethoxysilane, dimethyldimethoxysilane, tetraethyl orthosilicate, tetramethyl orthosilicate, and tetramethoxyethoxy orthosilicate. In an embodiment, the silane composition is dicyclopentyldimethoxysilane, methylcyclohexyldimethoxysilane, or n-propyltrimethoxysilane, and any combination of thereof. In a further embodiment, the silane is dicyclopentyldimethoxysilane.

Gas-phase polymerization requires that the velocity of the fluidizing medium be sufficient to maintain the bed of formed polymer particles in a fluidized state. The velocity of the fluidizing medium, is also referred to as the superficial gas velocity. As used herein, "superficial gas velocity" (or "SGV") is a measure of the flow of the fluidizing medium through the reactor. SGV is calculated by dividing cycle gas volumetric flow by reactor cross-sectional area. A minimum SGV is needed for proper fluidization of the particle bed. In condensed-mode operation of the gas-phase polymerization reactor, a minimum SOY is required to carry condensed liquid from the heat exchanger to the reactor. The terms "fluidizing medium velocity" and "superficial gas velocity" are used interchangeably.

in an embodiment, the product produced in the gas-phase polymerization reactor is a propylene-based polymer (propylene homopolymer, propylene/olefin copolymer), an ethylene-based polymer (ethylene homopolymer, ethylene/olefin copolymer) or an ethylene/propylene rubber.

The fluidized bed allows rapid transfer of heat from the growing polymer particles to the fluidizing medium. The fluidizing medium can be cycled/recycled from the reactor to remove heat from the system. The fluidized bed also enables rapid transfer of reactants to active catalyst sites, enhancing effective catalyst productivity. The reactor can be a gas-phase condensing-mode polymerization reactor.

The structure of the fluidized bed changes as the SOY changes. Known are the following fluidization regimes (listed from low to high SGV): (i) fixed bed, (ii) minimum fluidization (iii), smooth fluidization, (iv) bubbling fluidization, (v) turbulent fluidization, (vi) conveying, and (vii) pneumatic transport. Each fluidization regime has distinct features differing from each other regime. For example, a turbulent regime is not simply a regular dense bed of bubbling fluidization regime having substantial freeboard activities. Consequently, models for one regime may not necessarily apply to another regime. For example, models and correlations developed for bubbling fluidization regimes or fast fluidization regimes cannot be applied for turbulent fluidization regimes.

Fluidization regimes are distinguishable by bubble behavior. The bubbling fluidization regime exhibits discernible bubbles. Bubble interaction is dominated by bubble coalescence in the bubbling fluidization regime.

The "turbulent regime," or "turbulent fluidization" is characterized by many small bubbles/voids with a predominant tendency of bubble break-up as opposed to bubble coalescence. Turbulent fluidization occurs when a significant portion of the bubbles begin to lose their shape near the top of the bed, and a turbulent motion of clusters and voids of gas of various sizes and shapes appears. Bubbles in the turbulent regime split and reorganize frequently, the bubbles being irregular in shape with vague boundaries and are often referred to as "gas voids" or "voids," Bubbles/voids move violently, rendering it difficult to distinguish the continuous and discrete phases in the bed. At higher SGV in the turbulent regime, the clear boundary of bubbles/voids disappears and the non-uniformity of solids concentration distribution yields gas voids which become less distinguishable as the gas velocity further increases towards fast fluidization. As the superficial gas velocity is increased, the onset of turbulent fluidization is associated with a transition velocity. Pressure fluctuations diminish in the fluidized bed as the SGV is increased to a certain point. As used herein, "transition velocity," or "$U_c$" is the SOY at which the mean amplitude of pressure fluctuations peak. The transition velocity, $U_c$, also demarcates the onset of the turbulent regime (from the bubbling regime), it is recognized that turbulent fluidization might not exist homogeneously across the vertical dimension of the bed.

"Fast fluidization" or "fast fluidization regime" is characterized in that the pressure gradient along the direction of transport is a monotonic function of the quantity of injected solid, for equal flow rate and density of the fluidizing medium. Turbulent fluidization yields to fast fluidization when the bubbles and voids are diminished in size to the same order of magnitude of the solid particles. As used herein, "transport velocity" or "$U_k$" is the termination of turbulent fluidization and the onset of fast fluidization, as the superficial gas velocity increases. The $U_k$ is the SOY which demarcates the termination of turbulent fluidization and the onset of fast fluidization. The transport velocity is the gas velocity at which the mean amplitude of pressure fluctuations level off as the gas velocity is increased beyond $U_c$.

The gas-phase polymerization process includes determining a critical gas density for the fluidizing medium and adjusting the operating gas density of the fluidizing medium to be less than or equal to the critical gas density. As used herein, "critical gas density" is the density of the fluidizing medium at the transition point. The "transition point" is the demarcation between turbulent fluidization and fast fluidization. The critical gas density is determined by the following equation (I) below:

$$\left(\frac{a \times APS \times SBD}{SGV}\right)^b \quad (I)$$

wherein a is a constant with a value from about 3.5 to about 6.2, b is a constant with a value from about 1.7 to about 2.7, APS is the average particle size of the fluidized bed, SBD is the settled bulk density of the fluidized bed, and SGV is the superficial gas velocity of the fluidizing medium. In an embodiment, a is a value from about 4.3 to about 5.6 and b is a value from about 1.9 to about 2.5.

As used herein, "operating gas density" is the gas density of the fluidizing medium under reactor operating conditions. The operating gas density of the fluidizing medium is maintained less than or equal to the critical gas density as determined by the following equation (II) below:

$$\text{Operating gas density} \leq \left(\frac{a \times APS \times SBD}{SGV}\right)^b \quad (II)$$

wherein a and b are constants with values as disclosed in equation (I).

The applicants have surprisingly and unexpectedly discovered a model that accurately determines the demarcation between the turbulent regime and the fast fluidization regime. The parameters of APS, SBD, and/or SGV influence the value of the critical gas density. In other words, the APS, SBD, SGV (as well as values for a and b) influence or otherwise determine the demarcation between the turbulent regime and the fast fluidization regime.

In an embodiment, the present gas-phase polymerization process maintains the fluidizing medium at a velocity greater than the transition velocity, $U_c$. Consequently, at least a portion (or all, or substantially all) of the fluidized bed is in at least the turbulent regime during the polymerization process. In an embodiment, the fluidized bed is maintained in at least the turbulent regime during and/or after the adjustment of the operating gas density. In other words, the present process operates beyond the bubbling fluidization regime before, during, and/or after adjustment of the operating gas density. In another embodiment, the fluidized bed in the fast fluidization regime and adjustment of the operating gas density to or below the critical gas density increases the bulk density of the fluidized bed and moves the fluidized bed to the turbulent regime.

Adjustment of the operating gas density can occur in a number of ways. The operating gas density of the fluidizing medium can be moved or otherwise placed at or below the critical gas density by (i) adjusting a partial pressure of one or more gases that compose the fluidizing medium, (ii) adjusting or otherwise changing or altering the composition of the fluidizing medium, (iii) adjusting a gas phase reactor pressure, and (iv) any combination of (i)-(iii).

In an embodiment, the fluidizing medium contains propylene gas and at least one other gas. The other gas can be hydrogen, an olefin gas (such as ethylene, butene, or octene), and/or nitrogen gas. The process includes maintaining (some or all of) the fluidized bed in at least the turbulent regime and decreasing a propylene partial pressure of the fluidizing medium. When the fluidized bed is in the fast fluidization regime, reduction of the propylene partial pressure moves or otherwise places the operating gas density at or below the critical gas density. In addition, reduction of the propylene partial pressure increases the bulk density of the fluidized bed. Decreasing the propylene partial pressure causes a decrease in the density of the fluidizing medium. Not wishing to be bound by any particular theory, it is believed that reducing the fluidizing medium density reduces the fluidizing medium momentum (i.e., gas density×SGV) which reduces the lifting force on the bed, thereby allowing the bed to compress. The compressed bed has an increased FBD compared to the non-compressed bed prior to the reduction in fluidizing medium density.

In an embodiment, the propylene partial pressure of the fluidizing medium can be reduced alone or in combination with a reduction in the velocity of the fluidizing medium to place the operating gas density at or below the critical gas density. This also increases the bulk density of the fluidized bed.

In an embodiment, the composition of the fluidizing medium can be changed to adjust the gas density. For example, the composition of a fluidizing medium composed of an olefin gas and nitrogen can be changed by replacing the nitrogen gas with hydrogen gas. This change from nitrogen to hydrogen can change the partial pressure of the olefin gas and/or change the density of the fluidizing medium. In another embodiment, the overall reactor pressure can be changed, adjusted, and/or altered to change the operating gas density of the fluidizing medium.

In an embodiment, the polymerization process includes introducing a catalyst composition into the reactor to form polymer particles which compose the fluidized bed. The catalyst composition can be any catalyst composition as disclosed herein. The polymer particles have an average particle sized (APS) from about 0.014 inches to about 0.12 inches, or from about 0.018 inches to about 0.03 inches. In another embodiment, the polymer particles have a settled bulk density (SBD) from about 15 lb/ft$^3$ to about 35 lb/ft$^3$.

In an embodiment, the fluidizing medium flows or otherwise passes through the bed at a velocity from about 0.8 ft/second to about 5.0 ft/second.

In an embodiment, adjustment of the operating gas velocity increases the bulk density of the fluidized bed from about 10 wt % to about 100 wt %, or from about 20% to about 50%. The HEM increase is based on the FBD of the bed prior to adjustment of the operating gas density.

In an embodiment, another process for polymerizing one or more olefins in a gas-phase reactor is provided. The gas-phase reactor has a fluidized bed and a fluidizing medium. The process includes determining a critical gas velocity for the fluidizing medium and adjusting the operating gas velocity of the fluidizing medium to be less than or equal to the critical gas velocity. As used herein, "critical gas velocity" is the velocity of the fluidizing medium at the transition point. The "transition point" is the demarcation between turbulent fluidization and fast fluidization. The critical gas velocity is determined by the following equation (III) below:

$$\frac{a \times APS \times SBD}{(FMD)^{1/b}} \qquad (III)$$

wherein a is a constant with a value from about 3.5 to about 6.2, b is a constant with a value from about 1.7 to about 2.7, APS is the average particle size of the fluidized bed, SBD is the settled bulk density of the fluidized bed, and MID is the fluidized medium density. In an embodiment, a is a value from about 4.3 to about 5.6 and b is a value from about 1.9 to about 2.5.

As used herein, "operating gas velocity" is the gas velocity of the fluidizing medium under reactor operating conditions. The operating gas velocity of the fluidizing medium is maintained less than or equal to the critical gas velocity as determined by the following equation (IV) below:

$$\text{Operating gas velocity} \leq \frac{a \times APS \times SBD}{(FMD)^{1/b}} \qquad (IV)$$

wherein a and b are constants with values as disclosed in equation (I).

The parameters of APS, SBD, and/or FMD (as well as a and b) influence the value for the critical gas velocity. In an embodiment, the operating gas velocity is maintained at a velocity greater than Uc.

In an embodiment, the process includes maintaining the fluidized bed in at least the turbulent regime during the adjusting. This may include maintaining the operating gas velocity at a velocity greater than Uc. This increases the FBD. Not wishing to be bound by any particular theory, it is believed that reduction in operating gas velocity decreases the density of the fluidizing medium. Reducing the fluidizing medium density reduces the fluidizing medium momentum (i.e., gas density×SGV) which reduces the lifting force on the bed, thereby allowing the bed to compress.

In an embodiment, the process includes adjusting the operating gas velocity from a velocity greater than the critical gas velocity to less than or equal to the critical gas velocity. This increases the bulk density of the fluidized bed. For example, when the operating gas velocity is greater than the critical gas velocity, the fluidized bed can be in the fast fluidization regime. In this situation the operating gas velocity is controlled or otherwise adjusted to place some or all of the fluidized bed in a state of fast fluidization. Thus, the operating gas velocity can be greater than the transport velocity, $U_k$. The process includes decreasing the operating gas velocity to move the fluidized bed to the turbulent regime.

In an embodiment, the process includes adjusting the operating gas velocity from a velocity greater than Uk to a velocity less than Uk. This increases the FBD.

In an embodiment, the process includes introducing a catalyst composition into the reactor and forming a fluidized bed having an APS from about 0.014 inches to about 0.12 inches. The catalyst composition can be any catalyst composition as disclosed herein. The polymer particles have an SBD from about 15 lb/ft$^3$ to about 35 lb/ft$^3$.

In an embodiment, the fluidizing medium is composed of propylene gas and optionally a carrier gas such as hydrogen and/or nitrogen. The fluidizing medium has a gas density from about 2.5 lb/ft$^3$ to about 5.0 lb/ft$^3$. The propylene gas can have a partial pressure from about 300 psia to about 400 psia.

In an embodiment, adjustment of the operating gas density increases the bulk density of the fluidized bed from about 10 wt % to about 100 wt %, or from about 20% to about 50%. The increase is based on the FBD prior to adjustment of the operating gas velocity.

In an embodiment, another polymerization process is provided. The process is a polymerizing process for one or more olefins in a gas-phase reactor. The gas phase has a fluidized bed and a fluidizing medium. The fluidizing medium has an operating gas density and an operating gas velocity. The process includes determining a critical gas velocity for the fluidizing medium based on equation (III) above and adjusting the operating gas density or the operating gas velocity so that the operating gas velocity is less than or equal to the critical gas velocity. Adjustment of the operating gas density and/or the operating gas velocity increases the FBD from about 10% to about 100% (based on the FBD prior to adjustment).

In an embodiment, the process includes adjusting both the operating gas density and the operating gas velocity so the operating gas velocity is less than the critical gas velocity.

In an embodiment, the fluidizing medium is composed of propylene gas and at least one other gas. The process includes decreasing a partial pressure of the propylene gas to place the operating gas velocity at or below the critical gas velocity. This also increases the bulk density of the fluidized bed.

In an embodiment, the density of the fluidizing medium may be decreased by decreasing the propylene partial pressure and the operating gas velocity can also be decreased to move the operating gas velocity below the critical gas velocity. Reduction of both these parameters increases the FBD. The fluidized bed is maintained in at least the turbulent regime throughout the adjustments.

In an embodiment, the process includes decreasing the operating gas velocity from a velocity greater than the critical gas velocity to a velocity less than the critical gas velocity. The reduction in the operating gas velocity increases the bulk density of the fluidized bed.

In an embodiment, the process includes introducing a catalyst composition into the reactor and forming a fluidized bed having an APS from about 0.014 inches to about 0.12 inches. The catalyst composition can be any catalyst composition as disclosed herein.

In an embodiment, the process includes producing polymer particles having an SBD from about 15 lb/ft$^3$ to about 35 lb/ft$^3$.

Any of the foregoing process can increase the bulk density of the fluidized bed from 10% to about 100%, or from about 20% to about 80%, or from about 15% to 50%. The increase is based on the fluidized bed bulk density before the decreasing. In an embodiment, any of the foregoing processes can produce a fluidized bed with an FBD from about 1 lb/ft$^3$ to about 40 lb/ft$^3$, or from about 7 lb/ft$^3$ to about 40 lb/ft$^3$, or from about 7 lb/ft$^3$ to about 35 lb/ft$^3$.

Any of the foregoing processes can produce polymer at a rate from about 28 tons/hour to about 40 tons/hour, or from about 30 tons/hour to about 35 tons/hr, or about 33 tons/hour. Similarly any of the foregoing process can produce less than 5 wt % polymer fines, or from about 0.1 wt % to about 4 wt %, or from about 1 wt % to about 3 wt %, based on the weight of the produced polymer. As used herein, "polymer fines" is a polymer particle having a maximum diameter less than 180 µm as measured using a Gradex 2000 automated particle size analyzer.

In an embodiment, none of the foregoing processes increase the residence time of the catalyst composition, the olefin gas(es) and/or the polymer particles in the reactor. Thus, the present processes advantageously increases the FBD thereby increasing productivity by increasing the amount of polymer product produced in the same amount of time before any process adjustments. In other words, by increasing the FBD, the present processes produce more product without increasing production time. In an embodiment, the residence time is from about 0.5 hour to about 2 hours, or about 1 hour.

In an embodiment, a gas-phase polymerization reactor is provided. The reactor includes a fluidized bed of polymer particles. The polymer particles have an average particle size from about 0.014 inches to about 0.012 inches. The fluidized bed has a bulk density from about 1 lb/ft$^3$ to about 40 lb/ft$^3$ or from about 7 lb/ft$^3$ to about 35 lb/ft$^3$. The gas-phase reactor also includes a fluidizing medium. The fluidizing medium has an operating gas density less than or equal to the critical gas density as determined by equation (I) above. The fluidizing medium can also have an operating gas velocity less than or equal to the critical gas velocity as determined by equation (III) above. The fluidized bed is in at least the turbulent regime.

In an embodiment, the gas-phase polymerization reactor includes a catalyst composition and at least one olefin gas in an interior of the gas-phase reactor. The polymer particles formed as a result of the polymerization can be propylene-based polymer, ethylene-based polymer, and ethylene/propylene rubber. The polymer particles can have a settled bulk density from about 15 lb/ft$^3$ to 35 lb/ft$^3$.

In an embodiment, the fluidizing medium velocity is from about 0.5 ft/second to about 2.6 ft/second.

In an embodiment, the fluidizing medium is composed of propylene and at least one other gas, such as hydrogen or nitrogen. The fluidizing medium as a density from about 1.0 lb/ft$^3$ to about 5.0 lb/ft$^3$, or about 3 lb/ft$^3$. The propylene has a partial pressure from about 300 psia to about 400 psia.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, in reference to density, weight percent of component, molecular weights and other properties.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers), terpolymers (which usually refers to polymers prepared from three different types of monomers or comonomers), tetrapolymers (which usually refers to polymers prepared from four different types of monomers or comonomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term, "ethylene-containing polymer," as used herein, refers to a polymer that comprises at least 0.1 weight percent polymerized ethylene monomer (based on the total weight of polymerizable monomers), and optionally may comprise at least one polymerized comonomer.

The term, "propylene-based polymer," as used herein, refers to a polymer that comprises a majority weight percent polymerized propylene monomer (based on the total amount of polymerizable monomers), and optionally may comprise at least one polymerized comonomer.

"Productivity" is the weight of polymer produced per weight of catalyst used in the polymerization process (i.e., grains polymer/gram catalyst).

By way of example and not limitation, examples of the present disclosure will now be given.

EXAMPLES

Example 1

A polypropylene fluidized bed reactor was run at two different conditions: A, and B as outlined in the table below. The catalyst system is a Ziegler-Natta type supported catalyst together with an aluminum alkyl activator and an external donor. In changing conditions from A to B, gas density was reduced from 4.53 lb/ft3 (A) to 4.00 lb/ft3 (B) and SGV was reduced from 1.27 ft/s (0.39 m/s) (A) to 1.20 Ws (0.37 m/s) (B). As a result of the reduction in SGV, the critical gas density as calculated by Equation 1 above increased from 4.27 lb/ft3 to 4.44 lb/ft3 (with a=4.0 and b=2.3). During this time, the gas density was reduced by decreasing the propylene (C3H6) partial pressure from 393 psi (27.6 kg/cm2) to 360 psi (25.3 kg/cm2) (see FIG. 1). In case A, the gas density is greater than the critical gas density while in case B, the gas density is less than the critical gas density indicating a change in fluidization regime from fast fluidized to turbulent (Equation II above). With this change in fluidization regime, the upper fluidized bulk density increased by 25% from 7.7 to 9.6 lb/ft$^3$ (124 to 154 kg/m$^3$) and the lower fluidized bulk density increased by 21% from 8.0 to 9.7 lb/ft$^3$ (128 to 155 kg/m$^3$) (see FIG. 2). The polymer powder for this example had an APS of approximately 0.025 inch and a settled bulk density of 22 to 24 lb/ft$^3$.

TABLE 1

Summary of Effect of Reactor Condition Changes on Critical Gas Density and Fluidized Bulk Density

| Reactor Condition | | A | B |
|---|---|---|---|
| Temperature | (° C.) | 65.5 | 65.5 |
| Reactor Pressure | (psi) | 469 | 440 |
| Propylene Partial Pressure | (psi) | 393 | 360 |
| H$_2$ Concentration | (mole %) | 0.2 | 0.2 |
| C3H6 Concentration | (mole %) | 81.4 | 79.4 |
| C3H8 Concentration | (mole %) | 6.3 | 6.9 |
| N$_2$ Concentration | (mole %) | 11.1 | 12.9 |
| Gas Density | (lb/ft3) | 4.53 | 4.00 |
| Superficial Gas Velocity (SGV) | (ft/sec) | 1.27 | 1.20 |
| Bulk Density (SBD) | (lb/ft$^3$) | 24.1 | 22.5 |
| Average Particle Size (APS) | (inch) | 0.025 | 0.026 |
| Critical Gas Density | (lb/ft$^3$) | 4.27 | 4.44 |
| Upper Fluidized Bulk Density | (kg/m3) | 123 | 154 |
| Lower Fluidized Bulk Density | (kg/m3) | 128 | 155 |
| Bed Weight | (ton) | 23.0 | 28.1 |

FIG. 1 is a plot of fluidized bulk densities and bed weight

Example 2

A polypropylene fluidized bed reactor was run at two different conditions: A, and B during which time SGV was reduced from 1.30 ft/s (A) to 0.87 ft/s (B). All other reactor conditions were approximately held constant including the gas density at 2.82 lb/ft3. As a result of the reduction in SGV, the critical gas density as calculated by Equation I above increased from 2.19 lb/ft3 to 7.00 lb/ft3 (with a=4.0 and b=2.3). In case A, the gas density is greater than the critical gas density while in case B, the gas density is less than the critical gas density indicating a change in fluidization regime from fast fluidized to turbulent (Equation II above). The fluidized bulk density increased by 74% from 5.5 lb/ft3 (A) to 9.6 lb/ft3 (B).

TABLE 2

| Reactor Condition | | A | B |
|---|---|---|---|
| Reactor Temperature | ° C. | 70.0 | 70.0 |
| Reactor Pressure | psig | 422.2 | 422.2 |
| Gas Velocity (SGV) | ft/sec | 1.30 | 0.87 |
| Fluidized Bulk Density (FBD) | lb/ft3 | 5.5 | 9.6 |
| Gas Density | lb/ft3 | 2.82 | 2.82 |
| C3 partial pressure | psia | 320.1 | 318.6 |
| C3 Concentration | mol % | 73.2 | 72.9 |
| H2 Concentration | mol % | 12.4 | 12.4 |
| N2 Concentration | mol % | 14.9 | 15.0 |
| H2/C3 | mol ratio | 0.2 | 0.2 |
| Bulk Density (SBD) | lb/ft$^3$ | 25.9 | 22.1 |
| Average Particle Size (APS) | inch | 0.018 | 0.023 |
| Critical Gas Density | lb/ft$^3$ | 2.19 | 7.00 |

Figure 2:
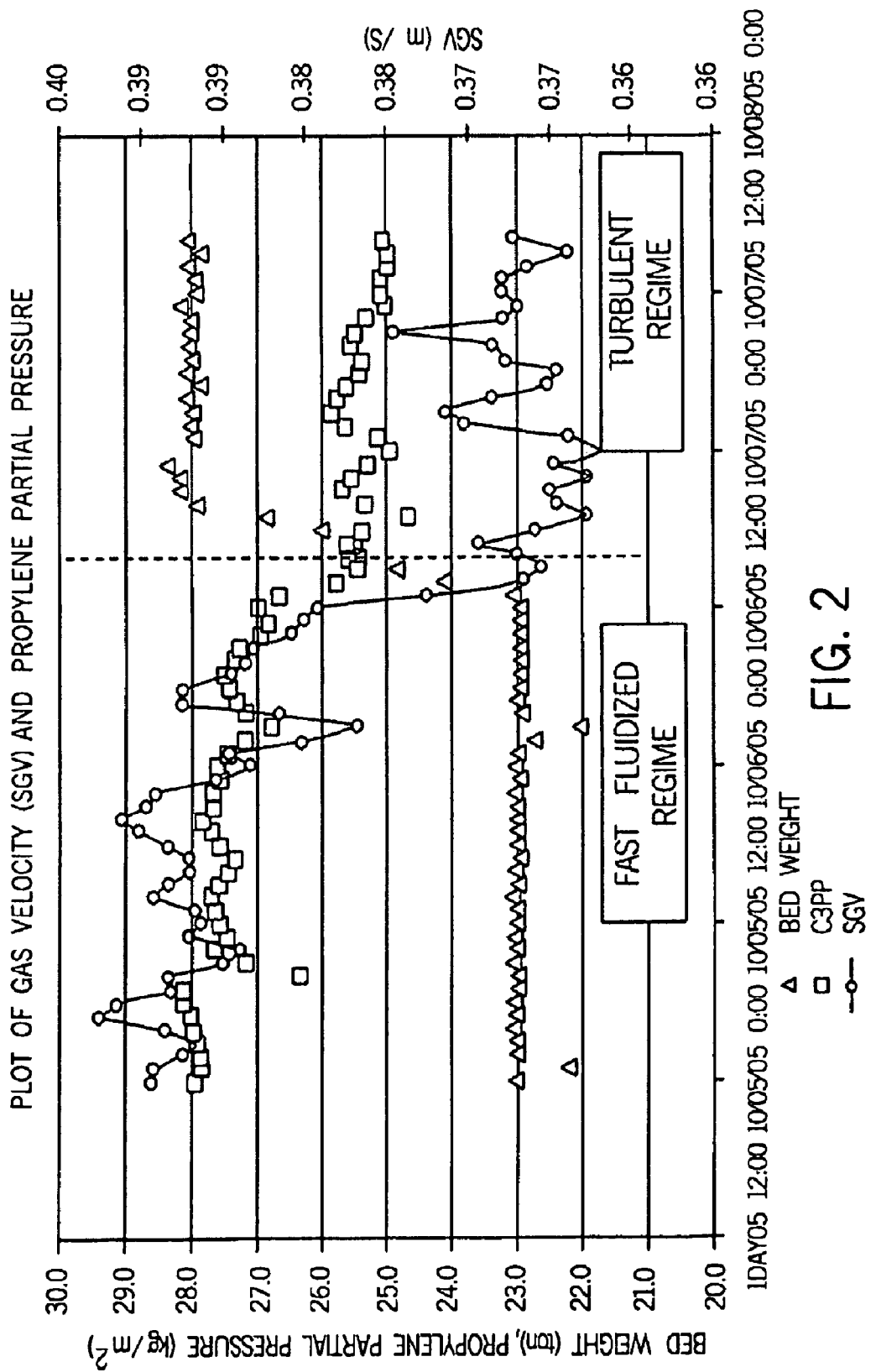
FIG. 2 is a graph of fluidized bulk density and bed weight in accordance with an embodiment of the present disclosure.

FIG. 2: Plot of Fluidized Bulk Densities and Bed Weight

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process for polymerizing one or more olefins in a gas-phase reactor having a fluidized bed and a fluidizing medium having an operating gas density, the process comprising:
   determining a critical gas density for the fluidizing medium with the following equation, $$\left(\frac{a \times APS \times SBD}{SGV}\right)^b$$

wherein
   a is a constant having a value of 4.0,
   b is a constant having a value of 2.3,
   APS is an average particle size of the fluidized bed as measured in inches,
   SBD is a settled bulk density of polymer particles of the bed measured in $lb/ft^3$,
   SGV is a gas velocity of the fluidizing medium as measured in ft/second; and
   adjusting the operating gas density of the fluidizing medium to be less than or equal to the critical gas density.

2. The process of claim 1 comprising maintaining the fluidized bed in at a least turbulent fluidization regime during the adjusting.

3. The process of claim 1 wherein the adjusting is selected from the group consisting of adjusting a partial pressure of a gas in the fluidizing medium, adjusting the composition of the fluidizing medium, adjusting a reactor pressure, and combinations thereof.

4. The process of claim 1 wherein the adjusting comprises moving the fluidized bed from a fast fluidization regime to a turbulent fluidization regime.

5. The process of claim 1 comprising maintaining the fluidized bed in at least a turbulent fluidization regime; and increasing, with the adjusting, a bulk density of the fluidized bed.

6. The process of claim 1 comprising moving the fluidized bed from a fast fluidization regime to a turbulent fluidization regime and increasing a bulk density of the fluidized bed.

7. The process of claim 1 wherein the fluidizing medium comprises propylene gas and at least one other gas, the process comprising maintaining the fluidized bed in at least a turbulent fluidization regime; decreasing a propylene partial pressure of the fluidizing medium; and increasing a bulk density of the fluidized bed.

8. The process of claim 1 comprising decreasing the operating gas density from above the critical gas density to below the critical gas density and increasing a bulk density of the fluidized bed.

9. The process of claim 1 comprising introducing a catalyst composition into the reactor and forming a fluidized bed having an APS from about 0.356 mm (0.014 inches) to about 3.048 mm (0.12 inches).

10. The process of claim 1 comprising producing polymer particles having an SBD from about 240.28 $kg/m^3$ (15 $lb/ft^3$) to 560.65 $kg/m^3$ (35 $lb/ft^3$).

11. The process of claim 1 comprising passing the fluidizing medium through the reactor at a velocity from about 0.24 m/second (0.8 ft/second) to about 1.52 m/second (5.0 ft/second).

12. A process for polymerizing one or more olefins in a gas-phase reactor having a fluidized bed and a fluidizing medium having an operating gas density and an operating gas velocity, the process comprising:
   determining a critical gas velocity for the fluidizing medium with the following equation;

$$\frac{a \times APS \times SBD}{(FMD)^{1/b}}$$

wherein
   a is a constant having a value of 4.0,
   b is a constant having a value of 2.3,
   APS is an average particle size of the fluidized bed,
   SBD is a settled bulk density of the fluidized bed,
   FMD is a density of the fluidizing medium; and
   adjusting the operating gas density or the operating gas velocity so that the operating gas velocity is less than or equal to the critical gas velocity.

13. The process of claim 12 comprising adjusting the operating gas density and adjusting the operating gas velocity so the operating gas velocity is less than the critical gas velocity.

14. The process of claim 12 comprising decreasing the operating gas velocity from a velocity greater than the critical gas velocity to a velocity less than the critical gas velocity; and increasing a bulk density of the fluidized bed.

* * * * *